United States Patent
Edvardsson (10) Patent No.: US 9,541,443 B2
(45) Date of Patent: Jan. 10, 2017

(54) GUIDED WAVE RADAR LEVEL GAUGING WITH PROBE RETAINING ELEMENT

(71) Applicant: Rosemount Tank Radar AB, Goteborg (SE)

(72) Inventor: Olov Edvardsson, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 347 days.

(21) Appl. No.: 14/138,611

(22) Filed: Dec. 23, 2013

(65) Prior Publication Data

US 2015/0177044 A1    Jun. 25, 2015

(51) Int. Cl.
*G01F 23/284* (2006.01)
*G01S 7/02* (2006.01)
*G01S 13/02* (2006.01)

(52) U.S. Cl.
CPC ............... *G01F 23/284* (2013.01); *G01S 7/02* (2013.01); *G01S 13/02* (2013.01)

(58) Field of Classification Search
CPC .................................................... G01F 23/284
See application file for complete search history.

(56) References Cited

U.S. PATENT DOCUMENTS

| | | | |
|---|---|---|---|
| 3,398,578 A * | 8/1968 | Dozer | G01F 23/284 73/304 R |
| 3,935,970 A * | 2/1976 | Spaw | G01F 23/284 222/56 |
| 3,995,212 A | 11/1976 | Ross | |
| 4,019,162 A * | 4/1977 | Banning | H01B 11/1834 333/244 |
| 5,011,434 A | 4/1991 | Blunt | |

(Continued)

FOREIGN PATENT DOCUMENTS

| | | |
|---|---|---|
| DE | 10 2004 032 965 | 2/2006 |
| WO | WO 2007/049966 | 5/2007 |

OTHER PUBLICATIONS

International Search Report and Written Opinion for PCT Application No. PCT/EP2014/078250, dated Apr. 9, 2015, 13 pages.

(Continued)

*Primary Examiner* — Matthew M Barker
(74) *Attorney, Agent, or Firm* — Westman, Champlin & Koehler, P.A.

(57) ABSTRACT

A GWR level gauge system for determining a filling level in a tank. The system comprises a tank, a transceiver, a surface waveguide comprising a single conductor transmission line probe, connected to the transceiver, arranged extending vertically into the tank and configured to guide the electromagnetic transmission signals towards the surface and to guide the reflected electromagnetic signals back to the transceiver; processing circuitry connected to the transceiver and configured to determine the filing level based on received reflected electromagnetic signals; a plurality of retaining elements arranged in fixed positions in relation to an inside of the tank and spaced apart along the probe, wherein each of the retaining elements circumscribes the probe, and is configured to allow movement of the probe in a vertical direction relative the retaining element, and to restrict movement of the probe in a horizontal direction relative the retaining element.

19 Claims, 7 Drawing Sheets

(56) References Cited

U.S. PATENT DOCUMENTS

| | | | | |
|---|---|---|---|---|
| 6,247,362 | B1* | 6/2001 | Soroka | G01F 23/284 |
| | | | | 73/290 V |
| 6,588,272 | B2* | 7/2003 | Mulrooney | G01F 23/263 |
| | | | | 116/204 |
| 6,681,626 | B2 | 1/2004 | Funfgeld | |
| 6,795,015 | B2* | 9/2004 | Edvardsson | G01F 23/284 |
| | | | | 342/118 |
| 7,367,231 | B1* | 5/2008 | Fauveau | G01F 23/26 |
| | | | | 73/304 C |
| 7,392,699 | B2* | 7/2008 | Motzer | B08B 1/008 |
| | | | | 73/290 R |
| 7,827,862 | B2* | 11/2010 | Fauveau | G01F 23/26 |
| | | | | 73/304 C |
| 9,074,922 | B2* | 7/2015 | Dayal | G01F 23/284 |
| 2004/0027137 | A1* | 2/2004 | Sherrard | G01F 23/284 |
| | | | | 324/644 |
| 2010/0156702 | A1 | 6/2010 | Edvardsson | |
| 2010/0200289 | A1 | 8/2010 | Neuber | |

OTHER PUBLICATIONS

Reference Manual, 00809-0100-4811, Rev CA, Feb. 2006, "Rosemount 330 Series, Guided Wave Radar Level and Interface Transmitters", Emerson Process Management, 146 pages.
SanShine Electronics, "Ceramic snail wire guides," BNSDOCID:<XP_55175570A_I_>0131029073742/http://www.sanshinechina.com/Ceramic-snail-wire-guides-productlist-6-4-0-1.html, retrieved Nov. 3, 2015, 2 pages.

* cited by examiner

GUIDED WAVE RADAR LEVEL GAUGING WITH PROBE RETAINING ELEMENT

FIELD OF THE INVENTION

The present invention relates to a level gauge system using electromagnetic waves for determining the distance to a surface of a product contained in a tank.

TECHNICAL BACKGROUND

Microwave level gauge, or radar level gauge (RLG), systems are in wide use for determining the filling level of a product contained in a tank. Radar level gauging may for example be performed by means of non-contact measurement, whereby electromagnetic signals are radiated towards the product contained in the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined. Determination of the distance can for example be based on time of flight of the received reflected signals.

Radar level gauge systems are used in marine applications for filling level monitoring and custody transfer control of liquid petroleum products. As an example, natural gas comprising predominantly methane and ethane is often transported at low temperature in liquid form in large cooled tanks arranged to maintain a temperature below the boiling point of the product. Heavier hydrocarbons such as butane and propane, also referred to as liquid petroleum gas (LPG) can be transported in liquid form in essentially spherical pressure tanks configured to withstand the elevated pressure commonly applied to liquefy LPG.

Due to the relatively low reflectivity of liquid natural gas (LNG) and LPG, a signal transmitted by a free radiating antenna may result in a reflected signal which is too small to detect. This may occur for example if the distance from the transceiver to the product is too large or if the surface of the product is disturbed so that the signal is scattered when reflecting at the surface.

In order to facilitate radar level gauge measurements also in large tanks where the distance between the antenna and the surface may be relatively large, typically on the order of several tens of meters, and under difficult measurement conditions, it is known to use a so called still pipe.

Use of a still pipe in a radar level gauge for measuring the level of LNG is for example disclosed by WO2007/049966. The still pipe is in fluid communication with the product in the tank and the filling level can be determined by determining the level of the product within the still pipe. By transmitting the signal within a still pipe, the energy of the transmitted electromagnetic signal is focused within the pipe to a small portion of the surface. Thereby, loss of signal power is reduced and measurement over larger distances and under more difficult measurement conditions is facilitated.

Furthermore, in marine applications, high sea states will cause a movement of the liquid in the tank which in turn results in a considerable mechanical force being applied on structures located in the tank. A still pipe arranged in a tank thus requires a support structure able to withstand considerable force.

Additionally, still pipes require a large amount of material which makes them costly, and they may also be complicated to install in a large tank.

SUMMARY OF THE INVENTION

In view of the above-mentioned and other drawbacks of the prior art, a general object of the present invention is to provide an improved guided wave radar level gauge system, and in particular a guided wave radar level gauge system for filling level determination of a fluid in a tank.

According to a first aspect of the present invention, these and other objects are achieved through a guided wave radar level gauge system for determining a filling level of a product contained in a tank, which level gauge system comprises: a tank having an inside wall, a roof, a bottom; a transceiver for transmitting electromagnetic transmission signals and receiving reflected electromagnetic signals reflected at a surface of the product; a surface waveguide comprising a single conductor transmission line probe, connected to the transceiver, arranged extending vertically into the tank and configured to guide the electromagnetic transmission signals towards the surface and to guide the reflected electromagnetic signals back to the transceiver; processing circuitry connected to the transceiver and configured to determine the filing level based on received reflected electromagnetic signals; a plurality of retaining elements arranged in fixed positions in relation to an inside of the tank and spaced apart along the probe, wherein each of the retaining elements circumscribes the probe, and is configured to allow movement of the probe in a vertical direction relative the retaining element, and to restrict movement of the probe in a horizontal direction relative the retaining element.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic.

The present invention is based on the realization that a guided wave radar level gauge system using a wire probe may advantageously be used for determining the filling level of a fluid product in a tank, and in particular for determining the filling level of liquefied natural gas (LNG) or petroleum gas (LPG) in a tank on-board a marine vessel, by using mechanical retaining elements to align the probe. In a different type of tank (3-10 m high without substantial movements of the liquid) the wire may run from tank top to bottom without support. In the deep tanks on a LNG-ship (>40 m) with sometimes big liquid movements the wire must be mechanically supported on several points.

Accordingly, the present invention is based on the use of a plurality of mechanical retaining elements attached to a support structure and spaced apart along the length of the probe. The probe is arranged to be circumscribed by the retaining element in such a way that movement of the probe in a vertical direction is allowed while movement in the horizontal direction is restricted. Thereby, if the wire probe is exposed to an external mechanical force having a horizontal force component, such as from a liquid moving within the tank, the force is taken up by one or more of the retaining elements which is distributed along the length of the probe, thereby reducing the risk that the mechanical force becomes so large that the wire probe breaks.

As LNG and LPG typically is transported in liquid form at a low temperature, methane for example is typically transported at its boiling point of approximately −162° C., the temperature difference between an empty and a filled tank can be up to 200° C. Thereby, for a probe having a length on the order of several tenths of meters, considerable thermal expansion and contraction may occur when the tank is being filled and emptied. For example, in a 45 m high tank, a thermal expansion of the probe by 5-10 cm may occur. Accordingly, a certain amount of vertical movement of the probe in relation to the retaining elements must be allowed. Furthermore, it may be desirable to be able to easily change the probe, which is possible as the retaining elements are not mechanically attached to the probe.

A further advantage of the present invention is that by not using a still pipe, the amount of material used in the radar level gauge system is drastically reduced.

Additionally, using a guided wave radar (GWR) system with a single conductor transmission line probe instead of a free radiating system comprising a still pipe allows for different signaling schemes to be used, such as for example a Frequency-modulated continuous-wave (FMCW) system.

According to one embodiment of the invention, at least one of the plurality of retaining elements may advantageously be attached to a support structure extending substantially in parallel with said probe. A support structure in a radar level gauge system according to the present invention does not have to withstand the same amount of force as a support structure for a still pipe, thereby making it possible to reduce the amount of material used or to otherwise simplify the design of the support structure.

Furthermore, such a support structure may for example be a support tower being attached to and extending substantially vertically from the roof of the tank. Tanks for holding a product such as LNG or LPG often come with a support tower connected to the roof of the tank. In such cases, the support tower may contain various sensors for monitoring the status of the tank. If such a support tower is present, it is advantageous to attach the retaining elements directly to the tower, so that no additional support structure is required.

According to one embodiment of the invention, the retaining element may advantageously comprise an electrically insulating material. In order to avoid that the probe is electrically short circuited when in physical contact with the retaining element, the retaining element is advantageously galvanically insulating, or at least galvanically insulated from an electrically conducting support structure on which the retaining element may be mounted.

In one embodiment of the invention, the probe may advantageously be a flexible wire probe. Flexible wire probes for GWR systems are for example used in large tanks for holding a liquid product such as LNG. Furthermore, using a flexible wire probe allows for different advantageous configurations of a retaining element which may not be possible using a rigid probe. Moreover, a flexible wire probe can more easily withstand forces acting on the probe. The flexible wire probe may for example be provided in the form of a solid wire or a stranded wire, and the probes may be made from metal such as stainless steel.

According to one embodiment of the invention, each retaining element may advantageously comprise at least a first electrically insulating contacting portion and a second electrically insulating contacting portion, vertically spaced in relation to the probe, wherein each contacting portion is configured to make contact with the probe at a contact location along the probe, and wherein a distance between adjacent contact locations is approximately equal to a quarter of a wavelength of the transmission signal. As it is desirable to maintain the probe in a more or less fixed horizontal position in relation to the retaining element such that the force with which the probe may act on the retaining elements is kept at a minimum, the retaining elements may be arranged so that portions of the retaining element are in constant contact with the probe. Thereby, the electrically insulating contacting portions are arranged to contact the probe, from different directions, so that the probe is prevented from moving. However, an object contacting the probe, even an insulating object, will lead to a certain reflection of a signal propagating along the probe. Reflections originating from the retaining element may make it more difficult to discern a surface echo, i.e. an echo from a surface of the product in the tank, which is required for determining the filling level in the tank. In a worst case scenario, such spurious echoes may give rise to false readings when a filling level of the product in the tank is to be determined. Thus, in order to maintain a good measuring accuracy, the retaining element must be designed to not disturb the filling level measurement, i.e. the echo from the retaining element must be considerably weaker than an echo from the liquid surface of the product in the tank.

However, by arranging the first and second electrically insulating portion at a vertical distance from each other corresponding to a quarter of a wavelength of the signal propagating along the probe, the echoes from the first and the second contacting portion will be superimposed and effectively suppressed through negative, or destructive, interference. Destructive interference is herein referring to the phenomena where two periodic waves, one being phase shifted, are superimposed such that a resulting signal is formed which have a lower amplitude than each of the original signals.

Accordingly, through the above described arrangement of the contacting portions of the retaining element, the amplitude of the resulting echo signal from the retaining element may be reduced. The wavelength of the signal is for example determined based on the center frequency of the signal.

In one embodiment of the invention, each retaining element may advantageously comprise a first contacting portion configured to reflect a portion of the transmission signal to form a first reflection signal; a second contacting portion, arranged below the first contacting portion, and configured to reflect a portion of the transmission signal to form a second reflection signal; and a third contacting portion, arranged below the second contacting portion, and configured to reflect a portion of the transmission signal to form a third reflection signal; wherein the contacting portions are further configured such that an amplitude of each of the first and third reflection signals is approximately half of an amplitude of the second reflection signal. By configuring the contacting portions such that the amplitude is different from the different contacting portions, three contacting portions may be used to achieve even further reduction of the resulting echo signal being reflected by the retaining element. The principle is the same as described above in connection with the retaining element comprising two contacting portions, the difference being that three different signals are superimposed to achieve destructive interference. An additional advantage of using three contacting portions to achieve three echo signals is that the bandwidth of the damping is increased. Thus, as a signal used for level gauging typically has a certain bandwidth, optimizing a retaining element comprising two contacting portions to obtain damping at the center frequency will inevitably lead to that portions of the signal outside of the center frequency will be less damped. Accordingly, by using a retaining element comprising three contacting portions, a more effective damping of portions of the signal deviating from the center frequency can be achieved.

In one embodiment of the invention, the first contacting portion is configured to reflect a portion of the transmission signal to form a first reflection signal; the second contacting portion is configured to reflect a portion of the transmission signal to form a second reflection signal; the retaining element further comprising: a third contacting portion, arranged below the second contacting portion at a distance approximately equal to a quarter of a wavelength of the transmission signal, and configured to reflect a portion of the transmission signal to form a third reflection signal; a fourth contacting portion, arranged below the third contacting portion at a distance approximately equal to a quarter of a wavelength of the transmission signal, and configured to reflect a portion of the transmission signal to form a fourth reflection signal; wherein the contacting portions are configured such that an amplitude of the first reflection signal is equal to an amplitude of the fourth reflection signal, an amplitude of the second reflection signal is equal to an amplitude of the third reflection signal, and the amplitude of the first and fourth reflection signals is approximately one third of the amplitude of the second and third reflection signals. In the same manner as described above, using four contacting portion portions further improves the bandwidth of the damping. However, there is naturally a tradeoff between the damping of the echo signal, and the overall damping of the signal. The more contacting portions are used, the larger the overall damping of the signal becomes. Therefore, the configuration of the retaining element for a particular application is preferably determined based on factors such as overall transmitted signal strength, reflection properties of the product to be gauged and the sensitivity of the signal processing circuitry in the receiver.

According to one embodiment of the invention the retaining element may advantageously comprises a plurality of pins spaced apart in the vertical direction arranged such that in a projection on the horizontal plane each pin overlaps at least one other pin. As seen from above, two pins in such a configuration would thus form a v-shape or an x-shape.

In one embodiment of the invention, each of the pins of a retaining element may advantageously be enclosed by a ceramic housing. As discussed earlier, electrically insulating properties of the retaining element is desirable in certain applications. By using a ceramic housing for each of the pins, or for a retaining element or electrically insulating contacting portion of any shape, an insulator is provided which is both electrically insulating as well as being mechanically resilient. In particular, in application where the probe regularly slides against a contacting portion of the retaining element, for example as a result of thermal expansion and contraction, it is desirable that the insulator of the contacting portion is not easily worn down. Thus, a ceramic housing also provides advantageous mechanical properties as it is resilient to wear and tear.

According to one embodiment of the invention, a flexible material is advantageously arranged between a pin or other type of retaining element and the ceramic housing. The flexible material helps to reduce the force acting on the retaining element as a whole, and thereby on the support structure, as a part of the force with which the probe may act on the retaining element is taken up and absorbed by the flexible portion. The flexible portion may be a solid flexible material such as rubber, plastic or the like, or it may be a spring arrangement.

According to one embodiment of the invention, a first portion of the retaining element is advantageously spaced apart in the vertical direction with respect to a second portion of the retaining element to form an opening between the first portion and the second portion such that the probe may be laterally inserted through the opening into an area circumscribed by the retaining element. Thereby, a retaining element is provided which allows for easy installation of a flexible probe through the opening of the different portions of the retaining element.

The retaining element may in one embodiment of the invention be provided in the form of a helix, which is a simple construction for restricting the horizontal movement of the probe while allowing easy installation of a flexible probe In one embodiment of the invention, the retaining element may advantageously comprise an electrically insulating clamping portion fixedly attached to the probe and a flexible portion attached to the support structure, wherein the flexible portion is flexible at least in a direction parallel to the vertical extension of said probe.

The retaining elements according to various embodiments of the invention may for example be attached to a side wall of the tank. Thereby, no additional support structure is required for achieving the desired function of limiting horizontal movement of the probe.

In various embodiments of the invention, the probe may by attached to the bottom of said tank. In such an embodiment, the probe/and or the attachment must be configured to allow thermal expansion/contraction of the probe.

Alternatively, the probe may comprise a bottom weight attached to an end portion of the probe for stabilizing the probe.

According to a second aspect of the invention, there is provided a method for arranging a probe in a guided wave radar level gauge system for determining a filling level of a product contained in a tank, which level gauge system comprises: a tank having an inside wall, a roof, a bottom; a transceiver for transmitting electromagnetic transmission signals and receiving reflected electromagnetic signals reflected at a surface of the product; a surface waveguide comprising a single conductor transmission line probe, connected to the transceiver; processing circuitry connected to the transceiver and configured to determine the filing level based on received reflected electromagnetic signals; the method comprising: arranging a plurality of retaining elements in fixed positions in relation to an inside of the tank and spaced apart along the probe, wherein each of the retaining elements circumscribes the probe, and is configured to allow movement of the probe in a vertical direction relative the retaining element, and to restrict movement of the probe in a horizontal direction relative the retaining element; and arranging the probe to extend vertically into the tank and to extend through each of the retaining elements.

Effects and features of this second aspect of the present invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION EXAMPLE EMBODIMENTS OF THE INVENTION

In the present detailed description, various embodiments of a system according to the present invention are mainly discussed with reference to a guided wave radar (GWR) level gauge system comprising a single conductor transmission line probe for guiding an electromagnetic signal towards the surface of a product contained in a tank. The classic GWR-system uses the TDR-principle with a train of 1 ns pulses occupying a spectral range of approximately 0.1-1 GHz. It is also possible to use a FMCW-system or a pulsed system using a carrier using for instance a frequency range like 1-2 GHz. The methods and system according to embodiments of the present invention will improve the situation in all cases but for a wider frequency range it is more difficult to obtain a good match over the entire frequency band.

Figure 1:
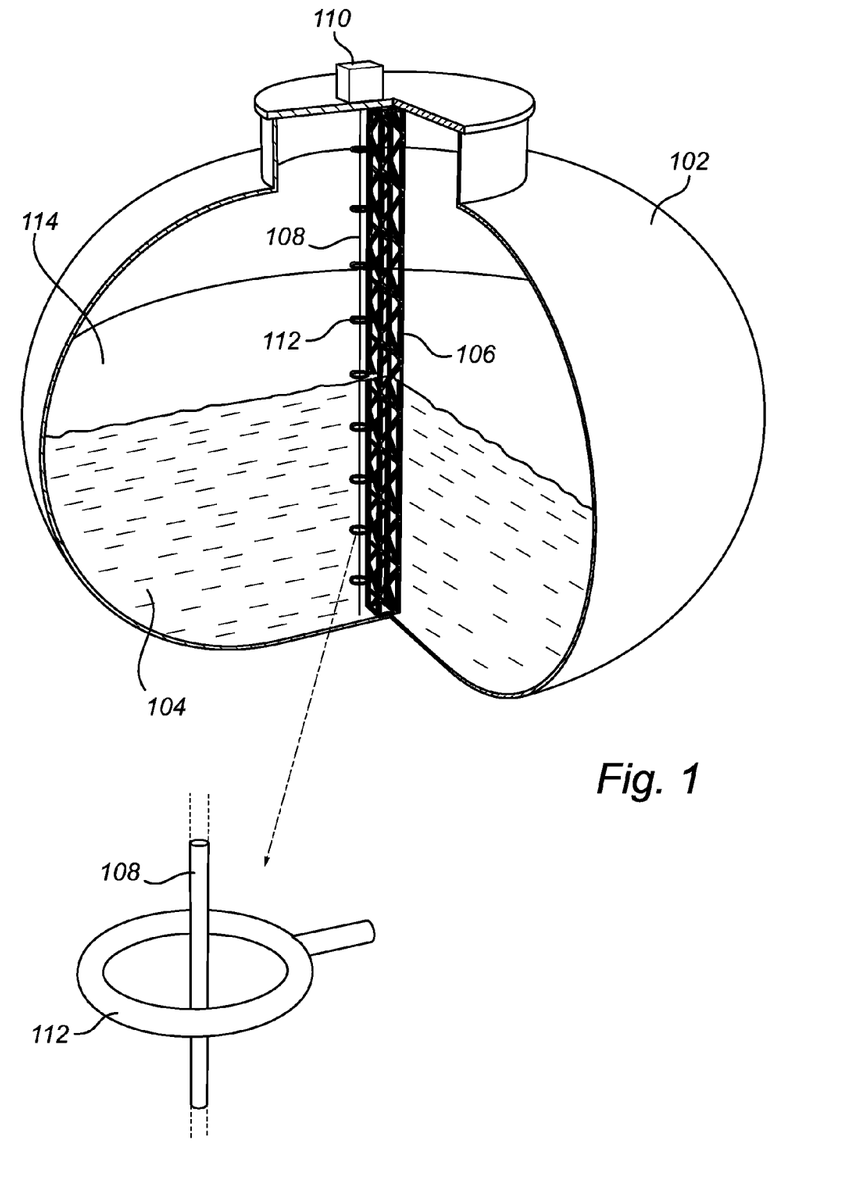
FIG. 1 schematically illustrates a system according to an embodiment of the invention.

FIG. 1 schematically illustrates a tank 102 and a guided wave radar level gauge system according to an embodiment of the invention. The tank 102 is here shown as a substantially spherical tank 102 of a type commonly used for storing and transporting liquefied natural gas in marine applications. In practice, several tanks of the type illustrated in FIG. 1 may be arranged on a marine transportation vessel. Thus, high sea-states will cause movement of the product 104 in the tank 102 which in turn will lead to a considerable force being applied both on the support tower 106 as well as on the probe 108. The electronics of the radar level gauge system is typically arranged outside of the tank as illustrated by the box 110. FIG. 1 further illustrates how the probe 108 may be arranged through a plurality of retaining elements 112 mechanically attached to the support tower so that the probe 108 is free to move in the vertical direction while movement is limited in the horizontal direction. Thereby, forces acting on the probe 108 in the horizontal direction are taken up by the retaining elements 112. And depending on the distance between adjacent retaining elements, the force taken by the probe itself can be controlled. Thus, by reducing the distance between the retaining elements, less force is taken up by the probe 108.

Further examples of probes are transmission line probes with two or more conductors, such as a twin line or a coaxial line. For practical level gauging applications using signals below 1 GHz (with wavelength above 300 mm) a transmission line probe diameter of 3-20 mm is commonly used. Other examples of probes include surface wave guides (SWGs), such as a single line transmission line (Goubau probe) or tube with or without dielectric coating. A surface wave guide can be very thin as compared to the wavelength; 4-8 mm is a common SWG diameter for use below 1 GHz. The probes may be made from metal, such as stainless steel, plastic, such as PTFE, or a combination thereof.

In the following, an example will be given to illustrate the effect of using a wire probe and retaining elements in comparison to if no retaining elements were to be used. In practice, careful strength calculations must be performed for the specific application and conditions for which the probe and system is to be used, the following should therefore be regarded as a non-limiting example.

A force acting on a cylinder in a direction perpendicular to the cylinder axis (central axis) form a flowing fluid having a certain velocity can be determined as $F=Ac\rho v^2/2$, where $\rho$ is the density of the fluid (approximately 800 kg/m$^3$ for a petroleum product), c is a form constant being equal to 0.6 under the assumption that the flow is linear. A is the area of the probe seen from the side, i.e for a probe having a diameter of 6 mm and a length L of 45 m, A is equal to 0.27 m$^2$. Assuming that the maximum velocity of the fluid flow is 6 m/s over the entire probe, the horizontal force T acting on the probe will be T=2.3 kN. The velocity is merely an estimate based on an assumption that the fluid may move from side to side within one "roll-period" for a vessel, which may be approximately 7-8 s. The velocity may be higher locally, but on the other hand, the velocity is not expected to be the same for the full extension of the probe. The stretch force which the probe can withstand is approximately 200 N/mm$^2$, based on the properties of stainless steel. For a probe having a diameter of 6 mm, the maximum allowable stretch force S would then be 6 kN. The probe will thus, with an evenly applied force, take the form of a parabola. The ends portions where the probe is attached, here assuming that the probe is mechanically attacked at the top and bottom of the tank, will bend out with and angle $\alpha$ which can be determined as $\tan(\alpha)=0.5$ T/S. With the numbers given above, $\alpha$ then becomes 11° and from the parabolic shape the maximum displacement of the probe d can be determined as 0.25 L $\tan(\alpha)$=2 m. A displacement of 2 m is obviously undesirable. Using supports in the form of retaining elements the displacement is substantially reduced. Using 10 supports, with a distance between adjacent supports of 4.5 m, the displacement would instead be 20 mm which is fully acceptable. The force acting on each retaining element would then become approximately 230 N, which is not unreasonable and which is also a force which makes it possible to design suitable retaining elements.

Figure 2:
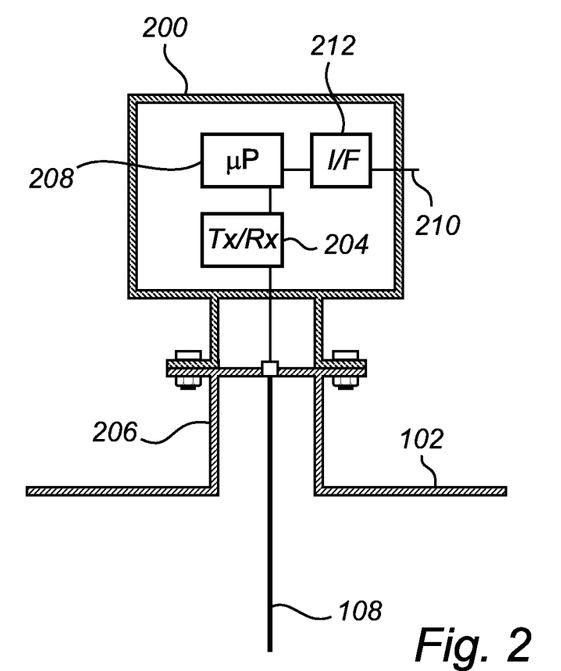
FIG. 2 is a schematic illustration of part of a radar level gauge system according to an embodiment of the invention.

FIG. 2 schematically illustrates a radar level gauge system according to an embodiment of the present invention, comprising an electronics unit 202, and a probe 108. The radar level gauge system 200 is installed on a nozzle 206 at the top of the tank 102. The probe 108 passes through the nozzle before entering the tank itself. By analyzing transmitted signals $S_T$ being guided by the probe 108 towards the surface 114 of the product 104, and reflected signals $S_R$ traveling back from the surface 114, the measurement electronics unit 200 can determine the distance between a reference position (such as the tank ceiling 210) and the surface 114 of the product 104, whereby the filling level can be deduced. It should be noted that, although a tank 102 containing a single product 104 is discussed herein, the distance to any material interface along the probe can be measured in a similar manner.

As is schematically illustrated in FIG. 2, the electronics unit 202 comprises a transceiver 104 for transmitting and receiving electromagnetic signals, a processing unit 208, which is connected to the transceiver 204 for control of the transceiver and processing of signals received by the transceiver to determine the filling level of the product 104 in the tank 102. The processing unit 208 is, furthermore, connectable to external communication lines 210 for analog and/or digital communication via an interface 212. Moreover, although not shown in FIG. 2, the radar level gauge system is typically connectable to an external power source, or may be powered through the external communication lines 210. Alternatively, the radar level gauge system may be configured to communicate wirelessly.

Figure 3:
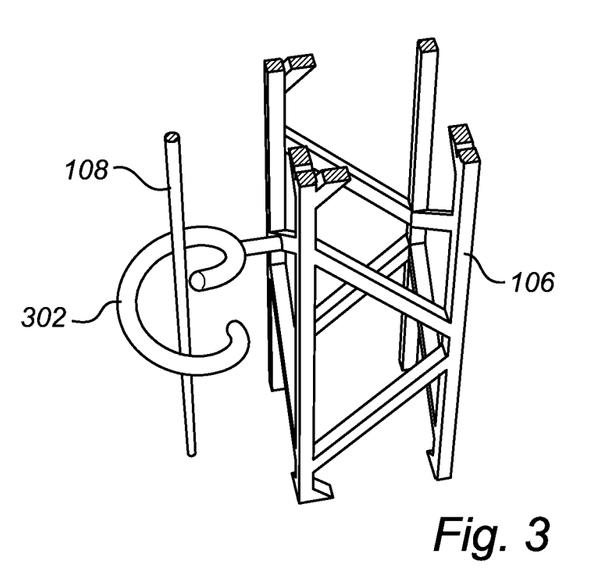
FIG. 3 is a schematic illustration of a retaining element according to an embodiment of the invention.

FIG. 3 schematically illustrates an example embodiment of a retaining element 302 in the form of a helix. An advantage of using a helix formed retaining element 302 is that the probe 108 may be inserted into the retaining element 302 from the side, which may simplify installation of the probe.

Figure 4A:
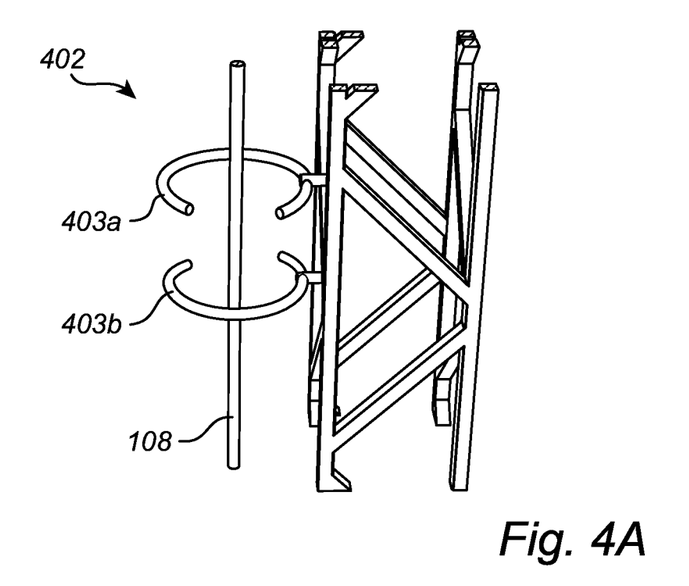
FIGS. 4A-E illustrates retaining elements according to various embodiments of the invention.
Figure 4B:
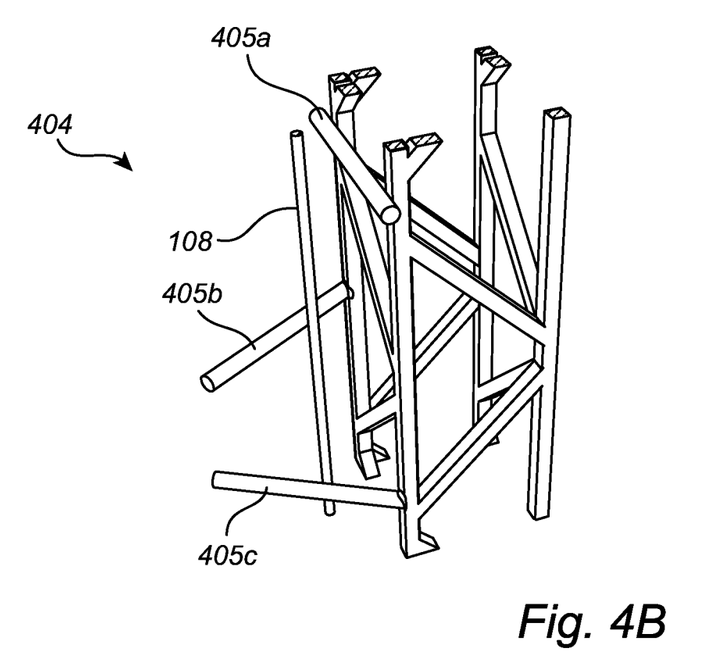

FIGS. 4a-d illustrate alternative embodiments of the retaining element. In FIG. 4a, the retaining element 402 is provided in the form of two arced, or semicircular, portions 403a-b, acting together to circumscribe the probe 108 so that horizontal movement of the probe 108 is limited. FIG. 4b shows a retaining element 404 comprising three pins 405a-c, or rods, arranged in a triangle shape and spaced apart from each other in the vertical direction.

In some applications, it may be desirable to ensure that the probe 108 does not move at all in relation to the retaining element. For example, the propagation properties of a signal propagating along a probe will typically be different at each point where the probe makes contact with a retaining element, and the influence of the retaining element on the propagating signal may also depend on the distance between the probe and the retaining element. Therefore, in applications where accuracy is crucial and where the surface echo is weak, such as the case may be when measuring LNG in a tank where the surface may be turbulent, it may be desirable to reduce the variation of the spurious echo signals resulting from the retaining elements. One way to address the above issue is to provide retaining elements arranged and configured such that the properties of the echo signal resulting from the retaining element is known. This may be achieved by providing a retaining element in such a way that the probe is already in contact with the retaining element at known locations along the probe. Such an arrangement will also require that either the probe or the retaining element is electrically insulating. The probe may be made electrically insulating by enclosing the probe in an insulating material such as PTFE. However, PTFE is relatively soft and therefore sensitive to mechanical war and tear which may occur when the probe moves in the vertical direction and rubs against the retaining element. A preferred option may then be to enclose the portions of the retaining element making contact with the probe with a material such as a ceramic insulating material which is both a good electrical insulation and resilient to mechanical wear. Very durable ceramic attachments are for example known from electrical power lines.

In embodiments where retaining elements are used which are arranged in contact with the probe, the diameter of the probe is preferably constant to facilitate vertical movement of the probe in relation to the retaining element.

Figure 4C:
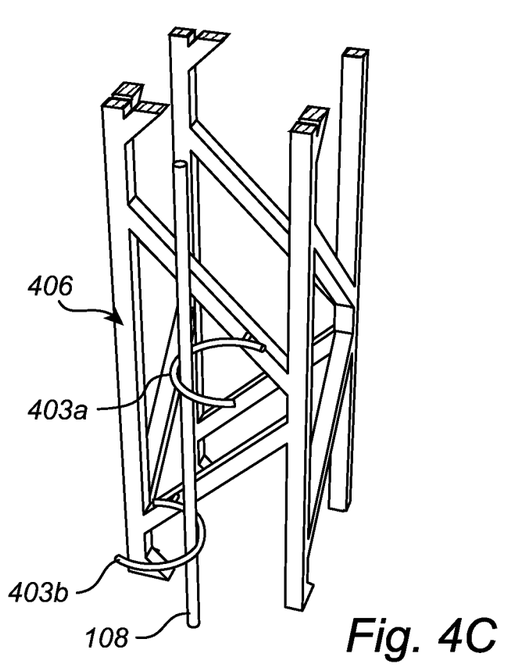

FIG. 4c schematically illustrates a retaining 406 element similar to the retaining element of FIG. 4a, but where the pins 403a-b are arranged to make contact with the probe 108, thereby forming well defined contacting portions. In order to reduce the resulting echo signal from the retaining element, the distance between the contacting portions is selected to be equal to a quarter of the wavelength of the center frequency, $\lambda_c/4$, of the transmitted signal propagating along the probe. Thereby, reflection signals from the first contacting portion 403a and reflection signals from the second contacting portion 403b are shifted by $\lambda_c/2$, thus creating destructive interference in the resulting superimposed echo signal. Preferably, the amplitude of the reflecting signal from the first contacting portion 403a is equal to the amplitude of the reflection signal from the second contacting portion 403b.

Figure 4D:
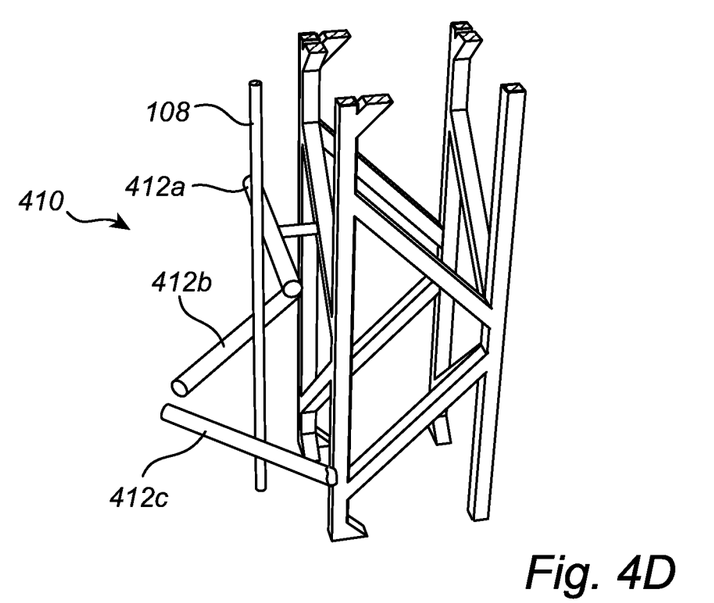

In FIG. 4d, a retaining element 410 comprising three contacting pins 412a-c is illustrated. Also here, the distance between adjacent contacting portions is $\lambda_c/4$. However, to achieve efficient reduction of the resulting echo signal, i.e. effective destructive interference, the amplitude of the reflection signal from each of the respective contacting portions must be controlled. When using three contacting portions, the amplitude of the reflection signal from the first and third contacting portion, 412a and 412c, is approximately half of the amplitude of the reflection signal from the second contacting portion 412b.

Figure 4E:
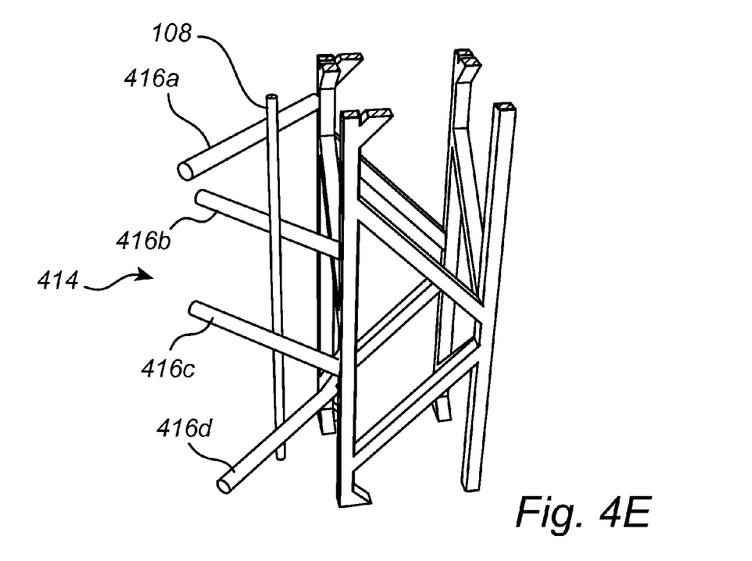

As illustrated in FIG. 4e, when using a retaining element 414 comprising four contacting pins 416a-d, the contacting portions are configured such that an amplitude of the first reflection signal is equal to an amplitude of the fourth reflection signal, an amplitude of the second reflection signal is equal to an amplitude of the third reflection signal, and the amplitude of the first and fourth reflection signals is approximately one third of the amplitude of said second and third reflection signals.

The above described concept may of course be extended using five or more contacting portions. There is however a trade-off between the number of contacting portions used and the overall energy loss of the transmitted signal. Thus, the precise configuration of a retaining element is typically determined based on parameters such as amplitude of the transmitted signal and the resolution required to accurately detect a surface echo.

Furthermore, it is not required that there is direct mechanical contact between the probe and a contacting pin for a reflecting signal to occur. For example, a pin or a portion of the retaining element may be arranged at a know distance from the probe and still reflect a portion of a signal propagating along the probe. Thereby, various combinations between contacting and non-contacting portions of the retaining element are possible. For example, a retaining element may be used which comprises three contacting portions, as illustrated in FIG. 4d, for maintaining the probe in a fixed position together with two non-contacting portions which are arranged in the proximity of the probe so that a reflecting signal of the desired amplitude is provided.

As an example, assuming a center frequency of the transmitted signal of 1 GHz, the distance between adjacent contacting portions, i.e. $\lambda_c/4$, is 7.5 cm. for higher frequencies, such as for example 10 GHz and above, the required distance between adjacent contacting portions may be too small to be practical, at least in the present application. For GWR systems, frequencies below a few GHz are typically most suited to keep resistive losses sufficiently low.

Figures 5A, 5B:
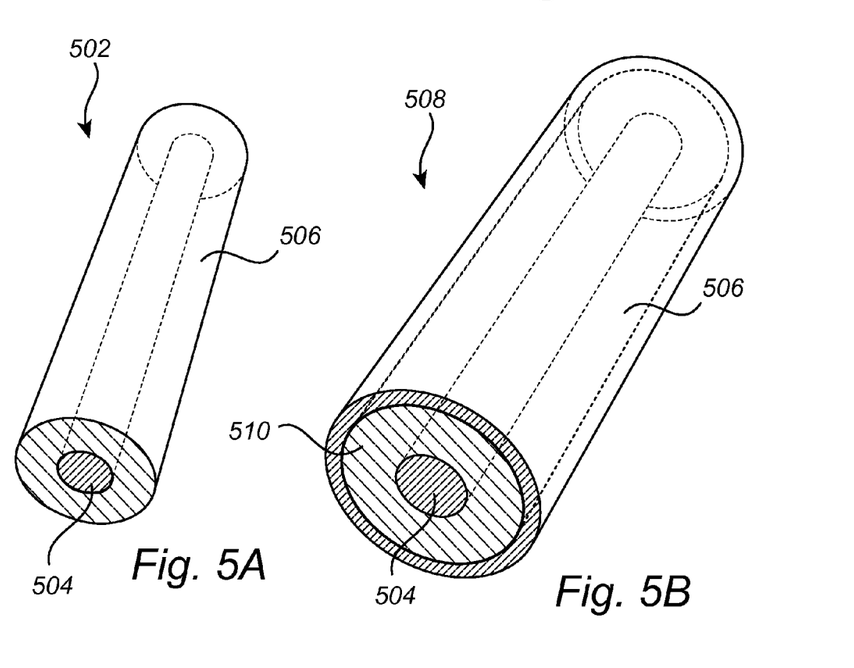
FIGS. 5A-B is a schematic illustration of retaining elements according to embodiments of the invention.

FIG. 5a illustrates an example embodiment of a pin 502 for a retaining element comprising a metal rod 504 enclosed by a ceramic housing 506 to provide electric insulation. When using the pin 502 as a contacting pin, the amplitude of the signal reflected by the pin 502 can be controlled by controlling the thickness of the ceramic housing 506, where a thicker insulator results in a reflected signal having a lower amplitude. The described configuration of a metallic core and a ceramic housing, or coating, may naturally be used for retaining elements of any geometry.

FIG. 5b schematically illustrates an example embodiment of a pin 508 for a retaining element comprising a central metal rod 504, an intermediate portion 510 made from flexible material arranged to surround the central rod 504, and an external electrically insulating housing or coating 506. The flexible intermediate portion 510 may act as a shock absorber for example to avoid that vibrations are transferred from the support structure 106 to the probe 108. The flexible material may for example be PTFE, rubber or any similar material providing the desired mechanically absorbing properties.

Figures 6A, 6B:
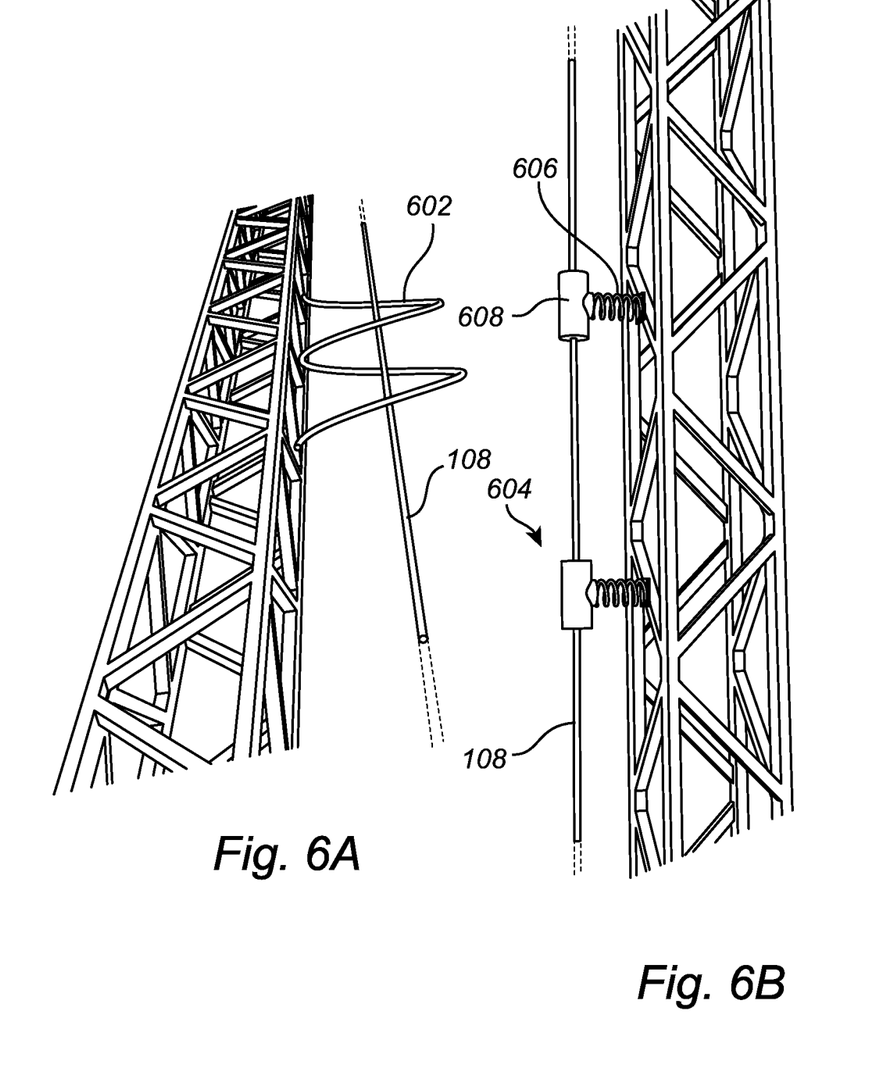
FIGS. 6A-B is a schematic illustration of retaining elements according to embodiments of the invention.

FIG. 6a illustrates a retaining element 602 in the form of a wavy structure, or what may be seen as an "flat" helix. The illustrated contacting element 602 is arranged to be in contact with the probe 108 at four different locations.

FIG. 6b schematically illustrates a retaining element 604 comprising a flexible portion 606 and an electrically insulating clamping portion 608 fixedly attached to the probe. The flexible portion 606, here illustrated as a spring, acts to allow vertical movement of the probe while restricting horizontal movement of the probe 108. The allowed movement of the probe is thus determined by the configuration of the flexible element. Furthermore, the part clamping portion which is in contact with the probe 108 is typically insulating. An electrically conducting portion for causing a reflecting signal from the retaining element 604 may be integrated in each clamping portion 608. Another option to achieve the desired properties of a resulting reflected echo signal is to integrate several electrically conducting reflecting portions, spaced apart by $\lambda_c/4$, within the clamping portion 608.

Figure 7:
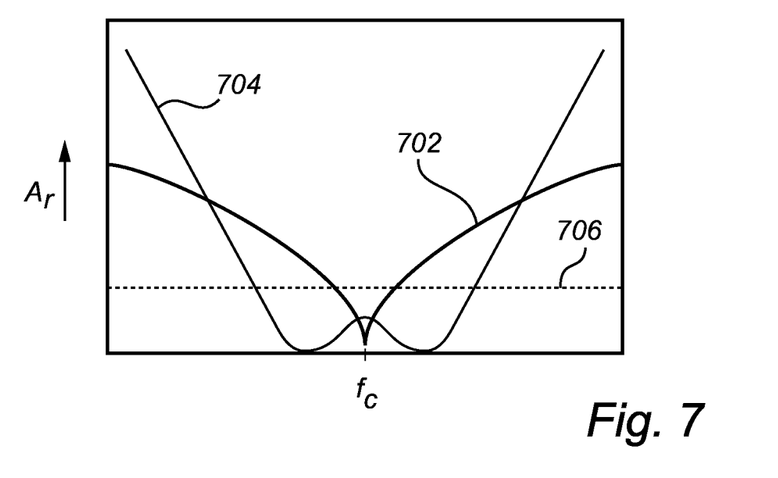
FIG. 7 is a graph schematically illustrating reflection properties of retaining elements according to various embodiments of the invention.

FIG. 7 schematically illustrates the properties of a resulting echo signal reflected from a retaining element as a function of frequency. $A_r$ corresponds to the amplitude of the resulting echo signal and $f_c$ is the center frequency of the transmitted signal propagating along the probe. The curve 702 corresponds to the resulting echo signal from a retaining element having two contacting portions and curve 704 is from a retaining element having three contacting portions. The line 706 represents an amplitude threshold under which a reflected signal is preferably maintained.

As can be seen in FIG. 7, the bandwidth of the portion of the echo signal under the threshold 706 is higher for a retaining element comprising more contacting portions.

Figure 8:
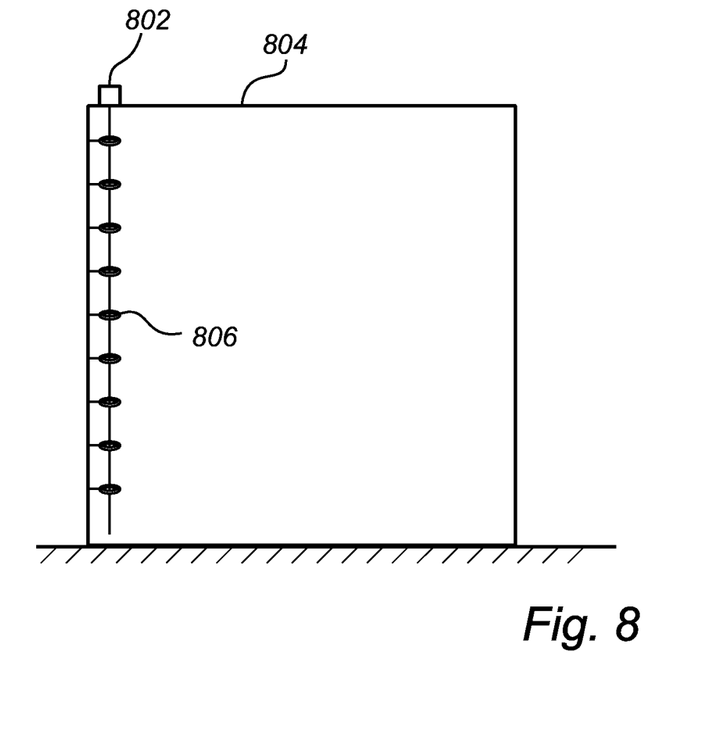
FIG. 8 schematically illustrates a system according to an embodiment of the invention.

FIG. 8 illustrate a radar level gauge system 802 arranged in a tank 804 without a support structure. Instead the retaining elements 806 are arranged on the sidewall of the tank.

Even though the invention has been described with reference to specific exemplifying embodiments thereof, many different alterations, modifications and the like will become apparent for those skilled in the art. For example, various configurations and geometries of the retaining elements are possible. Also, it should be noted that parts of the system may be omitted, interchanged or arranged in various ways, the level gauge system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A guided wave radar level gauge system for determining a filling level of a product contained in a tank, which level gauge system comprises:
   a tank having an inside wall, a roof, a bottom;
   a transceiver for transmitting electromagnetic transmission signals and receiving reflected electromagnetic signals reflected at a surface of said product;
   a surface waveguide comprising a single conductor transmission line probe, connected to said transceiver, arranged extending vertically into said tank and configured to guide said electromagnetic transmission signals towards said surface and to guide said reflected electromagnetic signals back to said transceiver;
   processing circuitry connected to said transceiver and configured to determine said filing level based on received reflected electromagnetic signals;
   a plurality of retaining elements arranged in fixed positions in relation to an inside of said tank and spaced apart along said probe,
   wherein each of said retaining elements circumscribes said probe, and is configured to allow movement of said probe in a vertical direction relative said retaining element, and to restrict movement of said probe in a horizontal direction relative said retaining element.

2. The guided wave radar level gauge according to claim 1, wherein at least one of said plurality of retaining elements is attached to a support structure extending substantially in parallel with said probe.

3. The guided wave radar level gauge according to claim 2, wherein said support structure is a support tower being attached to and extending substantially vertically from said roof of said tank.

4. The guided wave radar level gauge according to claim 2, wherein said retaining element comprises an electrically insulating clamping portion fixedly attached to said probe and a flexible portion attached to said support structure, wherein said flexible portion is flexible at least in a direction parallel to the vertical extension of said probe.

5. The guided wave radar level gauge according to claim 2, wherein said support structure is said tank wall.

6. The guided wave radar level gauge according to claim 1, wherein said retaining element comprises an electrically insulating material.

7. The guided wave radar level gauge according to claim 1, wherein said probe is a flexible wire probe.

8. The guided wave radar level gauge according to claim 1, wherein each retaining element comprises at least a first electrically insulating contacting portion and a second electrically insulating contacting portion, vertically spaced in relation to said probe, wherein each contacting portion is configured to make contact with said probe at a contact location along said probe, and wherein a distance between adjacent contact locations is approximately equal to a quarter of a wavelength of said transmission signal.

9. The guided wave radar level gauge according to claim 8, wherein each contacting portion is configured to reflect a portion of said transmission signal to form a reflection signal, such that an accumulated reflected signal, resulting from a superposition of a plurality of reflection signals, has an amplitude lower than each of said reflection signals.

10. The guided wave radar level gauge according to claim 8, wherein:
    said first contacting portion is configured to reflect a portion of said transmission signal to form a first reflection signal;

said second contacting portion is configured to reflect a portion of said transmission signal to form a second reflection signal; said retaining element further comprising:
a third contacting portion, arranged below said second contacting portion at a distance approximately equal to a quarter of a wavelength of said transmission signal, and configured to reflect a portion of said transmission signal to form a third reflection signal;
wherein said contacting portions are further configured such that an amplitude of each of said first and third reflection signals is approximately half of an amplitude of said second reflection signal.

11. The guided wave radar level gauge according to claim 8, wherein:
said first contacting portion is configured to reflect a portion of said transmission signal to form a first reflection signal;
said second contacting portion is configured to reflect a portion of said transmission signal to form a second reflection signal; said retaining element further comprising:
a third contacting portion, arranged below said second contacting portion at a distance approximately equal to a quarter of a wavelength of said transmission signal, and configured to reflect a portion of said transmission signal to form a third reflection signal;
a fourth contacting portion, arranged below said third contacting portion at a distance approximately equal to a quarter of a wavelength of said transmission signal, and configured to reflect a portion of said transmission signal to form a fourth reflection signal;
wherein said contacting portions are configured such that an amplitude of said first reflection signal is equal to an amplitude of said fourth reflection signal, an amplitude of said second reflection signal is equal to an amplitude of said third reflection signal, and said amplitude of said first and fourth reflection signals is approximately one third of said amplitude of said second and third reflection signals.

12. The guided wave radar level gauge according to claim 1, wherein said retaining element comprises a plurality of pins spaced apart in the vertical direction and arranged such that in a projection on the horizontal plane each pin overlaps at least one other pin.

13. The guided wave radar level gauge according to claim 12, wherein each of said pins is enclosed by a ceramic housing.

14. The guided wave radar level gauge according to claim 13, wherein a flexible material is arranged between said pin and said ceramic housing.

15. The guided wave radar level gauge according to claim 1, wherein a first portion of said retaining element is spaced apart in the vertical direction with respect to a second portion of said retaining element to form an opening between the first portion and the second portion such that said probe may be laterally inserted through said opening into an area circumscribed by said retaining element.

16. The guided wave radar level gauge according to claim 15, wherein said retaining element has the form of a helix.

17. The guided wave radar level gauge according to claim 1, wherein said probe is attached to the bottom of said tank.

18. The guided wave radar level gauge according to claim 1, wherein said probe comprises a bottom weight attached to an end portion of said probe.

19. A method for arranging a probe in a guided wave radar level gauge system for determining a filling level of a product contained in a tank, which level gauge system comprises:
a tank having an inside wall, a roof, a bottom;
a transceiver for transmitting electromagnetic transmission signals and receiving reflected electromagnetic signals reflected at a surface of said product;
a surface waveguide comprising a single conductor transmission line probe, connected to said transceiver;
processing circuitry connected to said transceiver and configured to determine said filing level based on received reflected electromagnetic signals; said method comprising:
arranging a plurality of retaining elements in fixed positions in relation to an inside of said tank and spaced apart along said probe, wherein each of said retaining elements circumscribes said probe, and is configured to allow movement of said probe in a vertical direction relative said retaining element, and to restrict movement of said probe in a horizontal direction relative said retaining element; and
arranging said probe to extend vertically into said tank and to extend through each of said retaining elements.

* * * * *